(12) United States Patent
Sato et al.

(10) Patent No.: US 12,718,997 B2
(45) Date of Patent: Aug. 25, 2026

(54) VACUUM CIRCUIT BREAKER

(71) Applicant: Mitsubishi Electric Corporation, Tokyo (JP)

(72) Inventors: Motohiro Sato, Tokyo (JP); Yasunori Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 366 days.

(21) Appl. No.: 18/683,300

(22) PCT Filed: Nov. 11, 2021

(86) PCT No.: PCT/JP2021/041568

§ 371 (c)(1),
(2) Date: Feb. 13, 2024

(87) PCT Pub. No.: WO2023/084700

PCT Pub. Date: May 19, 2023

(65) Prior Publication Data

US 2024/0371585 A1 Nov. 7, 2024

(51) Int. Cl.

*H01H 33/662* (2006.01)
*H01H 33/666* (2006.01)
*H02B 13/035* (2006.01)

(52) U.S. Cl.

CPC .. *H01H 33/66207* (2013.01); *H01H 33/6664* (2013.01); *H02B 13/0354* (2013.01); *H01H 2033/6623* (2013.01)

(58) Field of Classification Search

CPC ............ H01H 33/18; H01H 33/66207; H01H 33/6664; H01H 33/666; H01H 33/6661;

(Continued)

(56) References Cited

U.S. PATENT DOCUMENTS 4,538,039 A 8/1985 Gotoh et al.
5,191,180 A * 3/1993 Kitamura ............ H01H 33/666 218/135

(Continued)

FOREIGN PATENT DOCUMENTS

JP S5511007 U 1/1980
JP S58181218 A 10/1983

(Continued)

OTHER PUBLICATIONS

International Search Report (PCT/ISA/210) with English translation and Written Opinion (PCT/ISA/237) mailed on Jan. 25, 2022, by the Japanese Patent Office as the International Searching Authority for International Application No. PCT/JP2021/041568.

*Primary Examiner* — William A Bolton
(74) *Attorney, Agent, or Firm* — BUCHANAN, INGERSOLL & ROONEY PC

(57) ABSTRACT

A vacuum circuit breaker includes: a vacuum valve accommodated in a tank having a cylindrical shape; a movable-side shield installed on a movable side of the vacuum valve; a movable-side main contact point having a tubular shape to cover the vacuum valve and the movable-side shield from radially outside; a contact point driver that moves the movable-side vacuum contact point and the movable-side main contact point in conjunction with each other; and an insulating rod that transmits a force to the contact point driver. The contact point driver includes: a low gas pressure section lever connected to a contact via a contact pressure applier that applies a contact pressure to the contact; a rotary seal shaft fixed to the low gas pressure section lever; and a high gas pressure section lever fixed to a portion of the rotary seal shaft exposed to the high gas pressure section.

5 Claims, 7 Drawing Sheets

(58) Field of Classification Search
CPC .. H01H 33/143; H01H 33/166; H01H 33/662; H01H 33/122; H01H 2033/6623; H01H 2033/6665; H01H 2033/6667; H01H 33/565; H01H 33/66; H02B 13/0354; H02B 13/035
USPC ....... 218/134, 126, 127, 135, 136, 138, 139, 218/147, 118, 43, 10, 125
See application file for complete search history.

(56) References Cited

U.S. PATENT DOCUMENTS 8,748,770 B2 * 6/2014 Nakayama ......... H02B 13/0354 218/78
8,895,884 B2 * 11/2014 Yamamoto ........... H01H 33/666 218/7
9,082,572 B2 * 7/2015 Yoshida ............. H01H 33/6606
9,215,825 B2 * 12/2015 Sano ........................ H01H 9/08
9,646,785 B2 * 5/2017 Inoue ................... H01H 33/668
10,650,994 B2 * 5/2020 Bauer .................... H01H 33/42
2008/0197008 A1 * 8/2008 Einschenk ......... H01H 33/6661 200/48 R
2013/0213937 A1 8/2013 Yoshida et al.
2014/0076851 A1 * 3/2014 Yano ...................... H01H 33/40 218/120
2015/0180224 A1 * 6/2015 Arioka ................ H01H 33/161 361/118
2015/0206683 A1 * 7/2015 Ohda ..................... H01H 47/22 335/151
2015/0244158 A1 * 8/2015 Fukuoka ................ H01B 17/26 218/139
2018/0005784 A1 1/2018 Nagatake et al.

FOREIGN PATENT DOCUMENTS

JP 6044645 B2 12/2016
WO 2012063501 A1 5/2012

* cited by examiner

+X
-X
+Y
-Y
0
1
2a
2b
2c
4
5a
5b
11
12
13
14
15
17
18
19
25
26
41
41a
41b
41c
42
43
43a
43b
43c
44
45
50
70
112
181
182
191
192
441
442
451
452

2c
2b
1
2a
50
21
17
17
212
21
211
2a
2b
2c

VACUUM CIRCUIT BREAKER

FIELD

The present disclosure relates to a vacuum circuit breaker including a vacuum valve installed in a tank.

BACKGROUND

A bellows used to drive a contact point of a vacuum valve is buckled when a pressure difference between an inner surface and an outer surface thereof is large. Patent Literature 1 proposes enhancing durability of a bellows by making a pressure in a bellows inner peripheral side space of a vacuum valve to be lower than a pressure in a tank, and dividing a gas pressure section including the bellows and another gas pressure section.

CITATION LIST

Patent Literature

Patent Literature 1: International Publication No. 2012/063501

SUMMARY OF INVENTION

Problem to be Solved by the Invention

When an energizing current increases, it becomes difficult for a vacuum circuit breaker to keep a temperature rise value of a vacuum valve at a time of breaking within a design range. For this reason, a structure in which a main contact point is provided separately from a contact point of the vacuum valve is used for a vacuum circuit breaker that breaks a large current.

In order to achieve both downsizing of equipment and an increase in energizing current, it is necessary to separate a pressure section including the bellows and another gas pressure section while providing the main contact point different from the vacuum valve. However, separately providing a mechanism for opening and closing the contact point of the vacuum valve in the pressure section including the bellows and a mechanism for opening and closing the main contact point in another gas pressure section hinders reduction of a device size of the vacuum circuit breaker.

The present disclosure has been made in view of the above, and an object of the present disclosure is to provide a vacuum circuit breaker that achieves both downsizing of equipment and an increase in energizing current.

Means to Solve the Problem

In order to solve the above-described problem and achieve the object, a vacuum circuit breaker according to the present disclosure includes: a tank having a cylindrical shape; a vacuum valve accommodated in the tank and including a movable-side vacuum contact point, a fixed-side vacuum contact point, a movable lead electrically connected to the movable-side vacuum contact point, and a fixed lead electrically connected to the fixed-side vacuum contact point; a movable-side shield formed using a conductive material in a tubular shape and installed on a movable side of the vacuum valve; a movable-side main contact point having a tubular shape configured to cover the vacuum valve and the movable-side shield from radially outside; a fixed-side main contact point disposed to face the movable-side main contact point; a contact point driver configured to open and close a first contact point constituted by the movable-side vacuum contact point and the fixed-side vacuum contact point, and to open and close a second contact point constituted by the movable-side main contact point and the fixed-side main contact point, by moving the movable-side vacuum contact point and the movable-side main contact point in conjunction with each other; and an insulating rod configured to transmit a force for opening and closing the first contact point and the second contact point in conjunction with each other to the contact point driver. The contact point driver includes: a contact configured to electrically connect the movable-side shield and the movable lead, and is fixed to a movable-side end portion of the movable lead and disposed in a cylinder of the movable-side shield; a low gas pressure section lever disposed in a cylinder of the movable-side shield and connected to the contact via a contact pressure applier configured to apply a contact pressure to the contact; a rotary seal shaft fixed to the low gas pressure section lever, rotatably supported by the movable-side shield, penetrating the movable-side shield, and having an end portion exposed to a high gas pressure section inside the tank and outside the movable-side shield; and a high gas pressure section lever fixed to a portion of the rotary seal shaft exposed to the high gas pressure section and rotatably connected to the movable-side main contact point. An airtight material seals between the movable-side shield and the rotary seal shaft.

Effects of the Invention

According to the present disclosure, it is possible to obtain a vacuum circuit breaker that achieves both downsizing of equipment and an increase in energizing current.

DESCRIPTION OF EMBODIMENTS

Hereinafter, a vacuum circuit breaker according to embodiments will be described in detail with reference to the drawings.

First Embodiment

Figure 1:
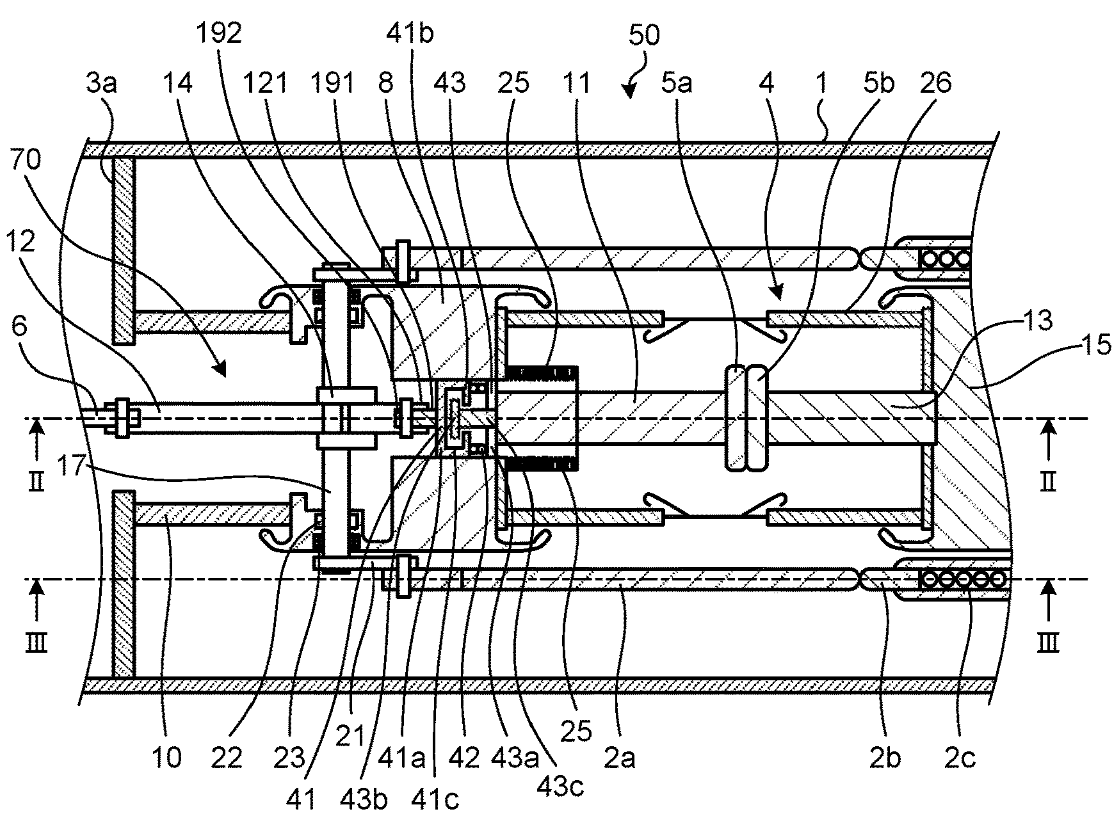
FIG. 1 is a horizontal cross-sectional view of a vacuum circuit breaker according to a first embodiment.
Figure 2:
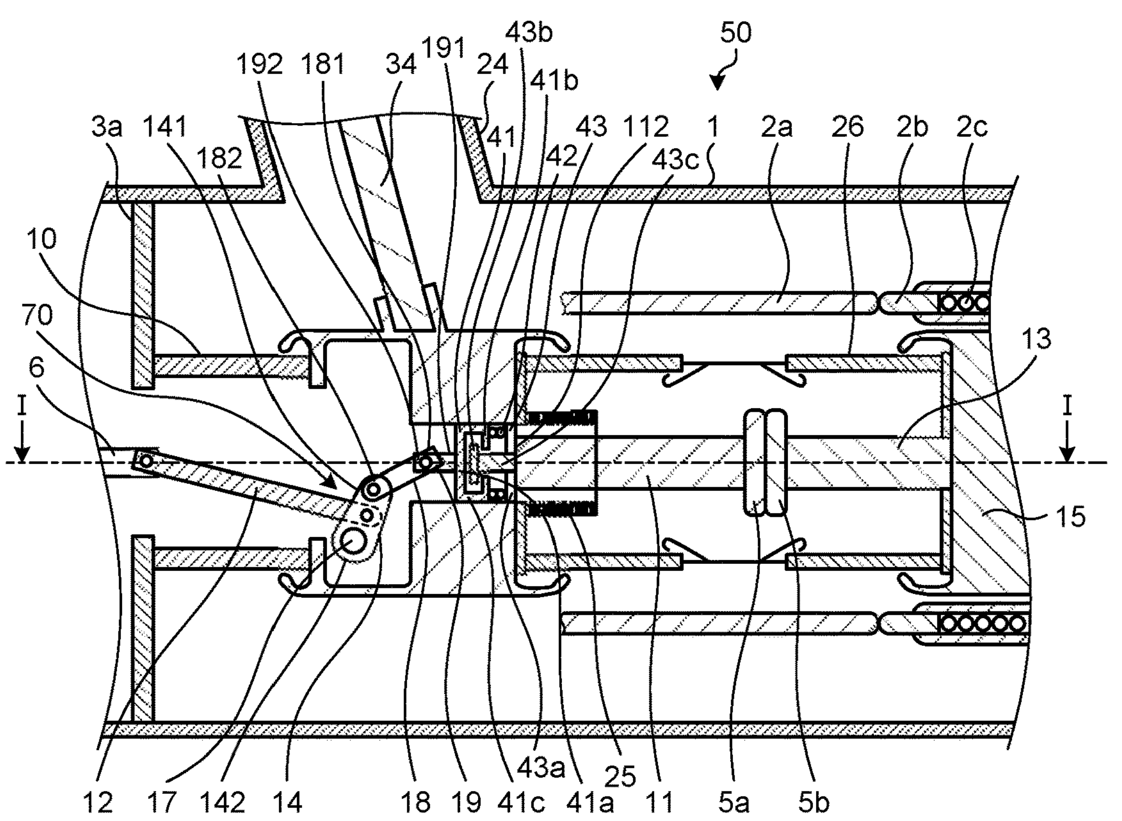
FIG. 2 is a vertical cross-sectional view of the vacuum circuit breaker according to the first embodiment.
Figure 3:
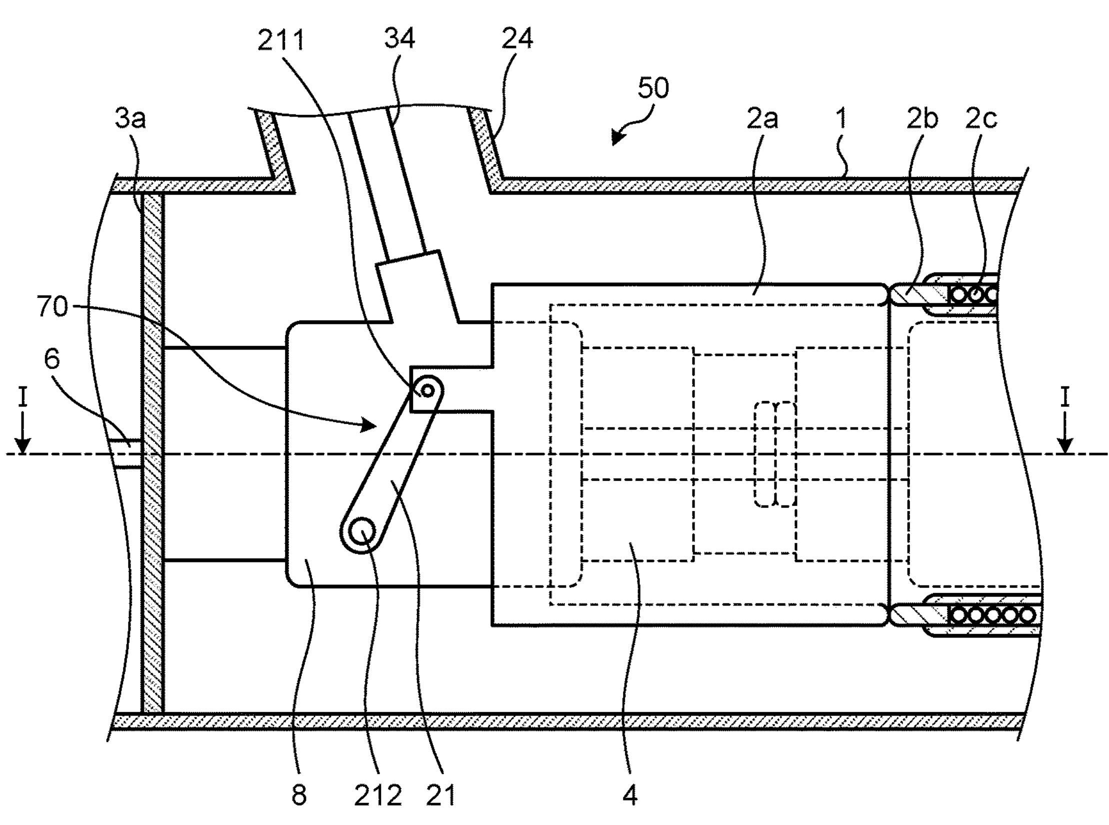
FIG. 3 is a vertical cross-sectional view of the vacuum circuit breaker according to the first embodiment.
Figure 4:
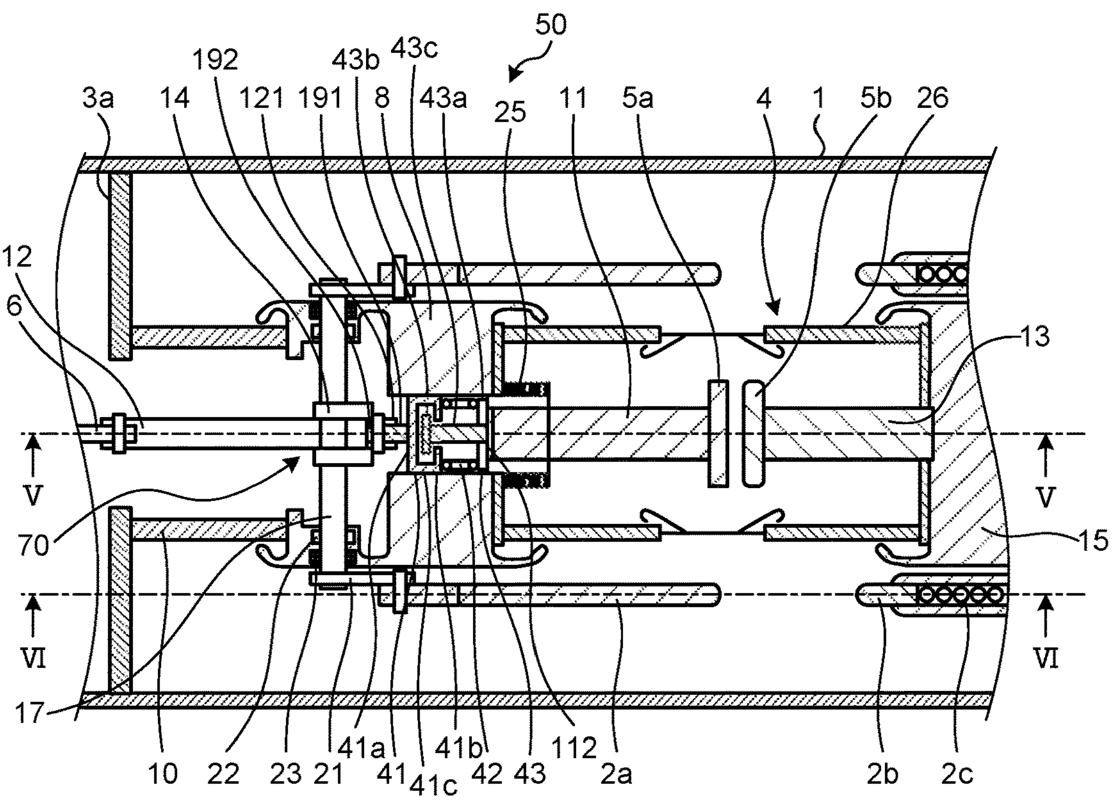
FIG. 4 is a horizontal cross-sectional view of the vacuum circuit breaker according to the first embodiment.
Figure 5:
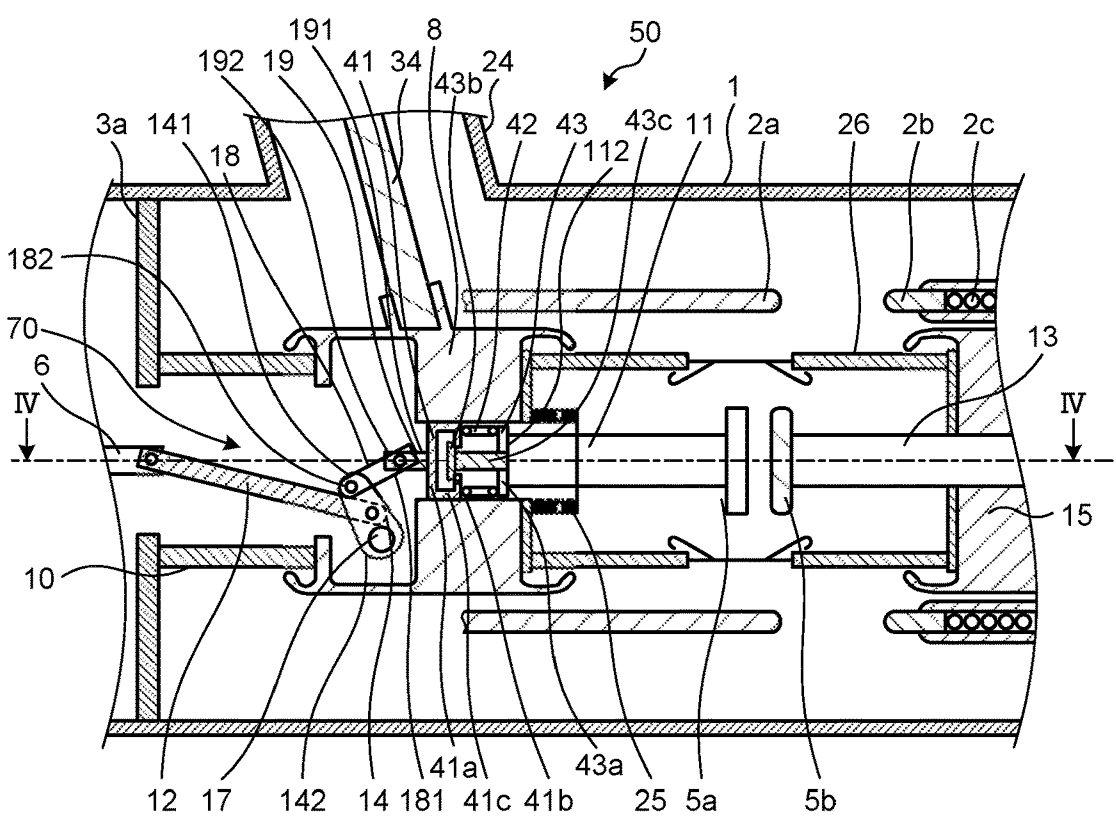
FIG. 5 is a vertical cross-sectional view of the vacuum circuit breaker according to the first embodiment.
Figure 6:
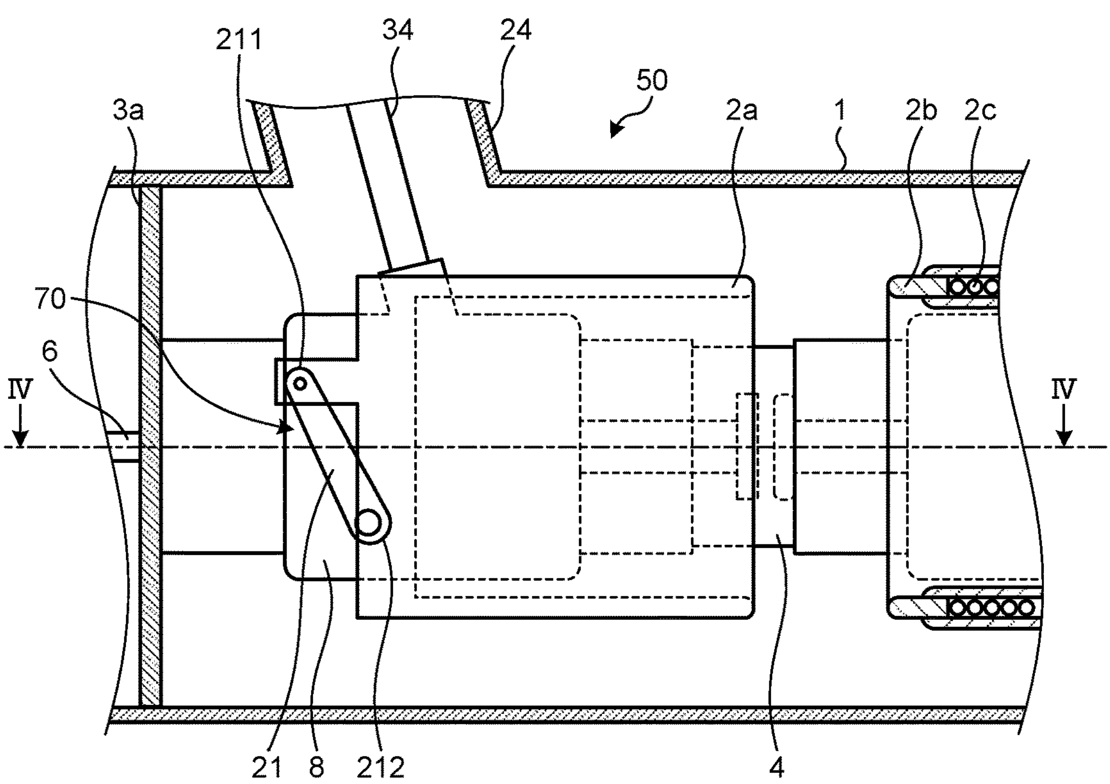
FIG. 6 is a vertical cross-sectional view of the vacuum circuit breaker according to the first embodiment.

FIG. 1 is a horizontal cross-sectional view of a vacuum circuit breaker according to a first embodiment. FIGS. 2 and 3 are vertical cross-sectional views of the vacuum circuit breaker according to the first embodiment. In FIGS. 1, 2, and 3, a vacuum circuit breaker 50 is in a closing state in which a first contact point constituted by a movable-side vacuum contact point 5*a* and a fixed-side vacuum contact point 5*b* is in contact and a second contact point constituted by a movable-side main contact point 2*a* and a fixed-side main contact point 2*b* is in contact. FIG. 1 illustrates a horizontal cross section taken along line I-I in FIGS. 2 and 3. The cross section illustrated in FIG. 1 is a horizontal cross section at a center in a height direction of a tank. FIG. 2 illustrates a vertical cross section taken along line II-II in FIG. 1. FIG. 3 illustrates a vertical cross section taken along line III-III in FIG. 1. FIG. 4 is a horizontal cross-sectional view of the vacuum circuit breaker according to the first embodiment. FIGS. 5 and 6 are vertical cross-sectional views of the vacuum circuit breaker according to the first embodiment. In FIGS. 4, 5, and 6, the vacuum circuit breaker 50 is in a breaking state in which the first contact point constituted by the movable-side vacuum contact point 5*a* and the fixed-side vacuum contact point 5*b* is open and the second contact point constituted by the movable-side main contact point 2*a* and the fixed-side main contact point 2*b* is open. FIG. 4 illustrates a horizontal cross section taken along line IV-IV in FIGS. 5 and 6. The cross section illustrated in FIG. 4 is a horizontal cross section at a center in the height direction of the tank. FIG. 5 illustrates a vertical cross section taken along line V-V in FIG. 4. FIG. 6 illustrates a vertical cross section taken along line VI-VI in FIG. 4. The vacuum circuit breaker 50 according to the first embodiment includes: a cylindrical tank 1 filled with an insulating gas; a vacuum valve 4 insulated and supported in the tank 1, and including the movable-side vacuum contact point 5*a* and the fixed-side vacuum contact point 5*b*; and a movable-side external conductor 34 and a fixed-side external conductor (not illustrated) disposed in a pair of bushings 24 extending upward in the tank 1.

The vacuum valve 4 includes: a vacuum container 26; a movable lead 11 electrically connected to the movable-side vacuum contact point 5*a*; a fixed lead 13 electrically connected to the fixed-side vacuum contact point 5*b*; and an expandable bellows 25 that connects a movable-side end surface of the vacuum container 26 and the movable lead 11. The movable-side vacuum contact point 5*a* of the vacuum valve 4 is movable, and the movable-side vacuum contact point 5*a* moves when the breaking state and the closing state are switched. A support plate 3*a* is installed at a movable-side end portion of the tank 1. The support plate 3*a* has a disk shape in which a hole is formed at a center. A fixed-side end portion of the tank 1 is closed by a support plate (not illustrated) having a disk shape without a hole. Note that, in an arrangement direction of the movable-side vacuum contact point 5*a* and the fixed-side vacuum contact point 5*b*, a direction from the fixed-side vacuum contact point 5*b* toward the movable-side vacuum contact point 5*a* is the "movable side", and a direction from the movable-side vacuum contact point 5*a* toward the fixed-side vacuum contact point 5*b* is the "fixed side".

The vacuum container 26 accommodates the movable-side vacuum contact point 5*a*, the fixed-side vacuum contact point 5*b*, and the fixed lead 13, and the movable lead 11 protrudes outward from one end portion. The bellows 25 connects the vacuum container 26 and the movable lead 11, extends in the closing state in which the first contact point constituted by the movable-side vacuum contact point 5*a* and the fixed-side vacuum contact point 5*b* is closed, and contracts in the breaking state in which the first contact point constituted by the movable-side vacuum contact point 5*a* and the fixed-side vacuum contact point 5*b* is open.

Further, the vacuum circuit breaker 50 includes: a movable-side shield 8 formed using a conductive material in a tubular shape and installed on the movable side of the vacuum valve 4; a movable-side insulating support cylinder 10 that insulates and supports the movable-side shield 8 on the support plate 3*a*; and a fixed-side shield 15 installed on the fixed side of the vacuum valve 4. The movable-side shield 8 electrically connects a lower end of the movable-side external conductor 34 to the movable lead 11. The fixed-side shield 15 electrically connects a lower end of the fixed-side external conductor (not illustrated) to the fixed lead 13.

In addition, the vacuum circuit breaker 50 includes the movable-side main contact point 2*a* having a tubular shaper to cover the vacuum valve 4 and the movable-side shield 8 from radially outside, and the fixed-side main contact point 2*b* that is disposed to face the movable-side main contact point 2*a*. In the vacuum circuit breaker 50, the movable-side main contact point 2*a* is movable, and the movable-side main contact point 2*a* moves when the breaking state and the closing state are switched.

Further, the vacuum circuit breaker 50 includes: a contact point driver 70 configured to open and close the first contact point constituted by the movable-side vacuum contact point 5*a* and the fixed-side vacuum contact point 5*b* and to open and close the second contact point constituted by the movable-side main contact point 2*a* and the fixed-side main contact point 2*b*, by moving the movable-side vacuum contact point 5*a* and the movable-side main contact point 2*a* in conjunction with each other; and an insulating rod 12 configured to transmit a force for opening and closing the first contact point and the second contact point in conjunction with each other to the contact point driver 70.

The contact point driver 70 includes: a contact 43 that is fixed to the movable-side end portion 112 of the movable lead 11, is disposed in a cylinder of the movable-side shield 8, and electrically connects the movable-side shield 8 and the movable lead 11; a low gas pressure section lever 14 disposed in the cylinder of the movable-side shield 8; a link 18 connected to the fixed side of the low gas pressure section lever 14; a low gas pressure section rod 19 connected to the fixed side of the link 18; a contact pressure plate 41 installed on the fixed side of the low gas pressure section rod 19; a contact pressure spring 42 installed between the contact pressure plate 41 and the contact 43; a rotary seal shaft 17 fixed to the low gas pressure section lever 14, penetrating the movable-side shield 8, and having an end portion protruding to a high gas pressure section inside the tank 1 and outside the movable-side shield 8; and a high gas pressure section lever 21 that is fixed to a portion of the rotary seal shaft 17 protruding to the high gas pressure section, and is rotatably connected to the movable-side main contact point 2*a*.

The contact 43 includes a disk-shaped first contact 43*a*, a disk-shaped second contact 43*b* having a diameter smaller than that of the first contact 43*a* and disposed on the movable side with respect to the first contact 43*a*, and a column portion 43*c* connecting the first contact 43*a* and the second contact 43*b*. The rotary seal shaft 17 is rotatably supported by the movable-side shield 8. The low gas pressure section lever 14 is disposed in the cylinder of the movable-side shield 8, and is connected to the contact pressure plate 41 via the link 18 and the low gas pressure section rod 19. The contact pressure plate 41 has a structure in which a disk-shaped first contact pressure plate 41*a* and a ring-shaped second contact pressure plate 41*b* are connected by a cylindrical portion 41*c*. An inner diameter of the second contact pressure plate 41*b* is smaller than a diameter of the second contact 43*b*. The second contact 43*b* is disposed in a space between the first contact pressure plate 41*a* and the second contact pressure plate 41*b*. The contact pressure spring 42 is provided between the second contact pressure plate 41*b* and the first contact 43*a*, and the contact pressure plate 41 is in contact with the contact 43 via the contact pressure spring 42. The contact pressure plate 41 and the contact pressure spring 42 constitute a contact pressure applier that applies a contact pressure to the contact 43. Note that, the contact point driver may include an attenuation mechanism that attenuates movement of the contact 43 along an axial direction of the tank 1. The attenuation mechanism is not limited to a specific structure.

The insulating rod 12 is connected to a shaft 6 of an operation device (not illustrated) installed outside the tank 1. A fixed-side end portion 121 of the insulating rod 12 is rotatably fixed to a middle portion of the low gas pressure section lever 14.

The low gas pressure section lever 14 has a movable-side end portion 142 fixed to the rotary seal shaft 17. A fixed-side end portion 141 of the low gas pressure section lever 14 is rotatably fixed to a movable-side end portion 182 of the link 18. A fixed-side end portion 181 of the link 18 is rotatably fixed to a movable-side end portion 192 of the low gas pressure section rod 19. A fixed-side end portion 191 of the low gas pressure section rod 19 is fixed to the first contact pressure plate 41*a*. The movable-side external conductor 34 is electrically connected to the movable-side vacuum contact point 5*a* via the movable-side shield 8, the contact 43, and the movable lead 11. A stroke of the movable-side vacuum contact point 5*a* by the contact point driver 70 is longer than a distance between the movable-side vacuum contact point 5*a* and the fixed-side vacuum contact point 5*b* in an opened state. Therefore, during a closing operation, the movable-side vacuum contact point 5*a* and the fixed-side vacuum contact point 5*b* come into contact with each other before an operation of the contact point driver 70 is completed, and the contact pressure spring 42 is compressed after the movable-side vacuum contact point 5*a* and the fixed-side vacuum contact point 5*b* come into contact with each other. For this reason, the contact pressure spring 42 is in a compressed state in the closing state in which the first contact point constituted by the movable-side vacuum contact point 5*a* and the fixed-side vacuum contact point 5*b* is closed, and presses the first contact 43*a* toward the fixed side to apply a contact pressure to the contact 43. Therefore, in the closing state, the movable-side vacuum contact point 5*a* is pressed against the fixed-side vacuum contact point 5*b* by the contact pressure spring 42.

Both end portions of the rotary seal shaft 17 disposed in the high gas pressure section are fixed to a movable-side end portion 212 of the high gas pressure section lever 21. A fixed-side end portion 211 of the high gas pressure section lever 21 is rotatably fixed to the movable-side main contact point 2*a*. A length of the high gas pressure section lever 21 is longer than a length of the low gas pressure section lever 14. The movable-side main contact point 2*a* has a tubular shape to cover the movable-side shield 8 and the vacuum valve 4 from radially outside. The fixed-side main contact point 2*b* has a tubular shape having a diameter identical to that of the movable-side main contact point 2*a*, and is biased toward the movable side by a contact pressure spring 2*c*.

As illustrated in FIG. 1, the rotary seal shaft 17 is rotatably supported by a bearing 22 installed on the movable-side shield 8. A gap between the rotary seal shaft 17 and the movable-side shield 8 is sealed by an airtight material 23, and gas is suppressed from moving through the gap between the rotary seal shaft 17 and the movable-side shield 8.

When a breaking command is input to the operation device (not illustrated), the shaft 6 moves to the movable side. The low gas pressure section lever 14 connected to the shaft 6 via the insulating rod 12 rotates about the rotary seal shaft 17 such that the fixed-side end portion 141 moves to the movable side. Further, when the rotary seal shaft 17 rotates together with the low gas pressure section lever 14, the high gas pressure section lever 21 also rotates about the rotary seal shaft 17 such that the fixed-side end portion 211 moves to the movable side.

The movable-side main contact point 2*a* fixed to the fixed-side end portion 211 of the high gas pressure section lever 21 moves to the movable side with rotation of the high gas pressure section lever 21. Therefore, when the shaft 6 moves to the movable side, the movable-side main contact point 2*a* moves to the movable side without delay. Whereas, the low gas pressure section rod 19 and the link 18 fixed to the fixed-side end portion 141 of the low gas pressure section lever 14 move to the movable side with rotation of the low gas pressure section lever 14. However, until the contact pressure spring 42 returns to a natural length, a state is maintained in which the movable-side vacuum contact point 5*a* is in contact with the fixed-side vacuum contact point 5*b*. After the contact pressure spring 42 returns to the natural length, the second contact 43*b* is pulled toward the movable side by the second contact pressure plate 41*b* along with movement of the low gas pressure section rod 19 toward the movable side, and the contact pressure plate 41, the contact pressure spring 42, the contact 43, the movable lead 11, and the movable-side vacuum contact point 5*a* move to the movable side to separate the movable-side vacuum contact point 5*a* from the fixed-side vacuum contact point 5*b*.

In this way, the movable-side main contact point 2*a* moves to the movable side without delay when the shaft 6 moves to the movable side, whereas the movable-side vacuum contact point 5*a* moves to the movable side after the contact pressure spring 42 returns to the natural length. Therefore, the contact point of the vacuum valve 4 is opened after the main contact point is opened first.

A length of the high gas pressure section lever 21 is longer than a length of the low gas pressure section lever 14. Therefore, a distance between the movable-side vacuum contact point 5*a* and the fixed-side vacuum contact point 5*b* in the breaking state is shorter than a distance between the movable-side main contact point 2*a* and the fixed-side main contact point 2*b* in the breaking state. For example, by setting a length of the high gas pressure section lever 21 to twice a length of the low gas pressure section lever 14, the distance between the movable-side main contact point 2*a* and the fixed-side main contact point 2*b* in the breaking state can be made twice the distance between the movable-side vacuum contact point 5*a* and the fixed-side vacuum contact point 5*b* in the breaking state.

When a closing command is input to the operation device (not illustrated), the shaft 6 moves to the fixed side. The low gas pressure section lever 14 connected to the shaft 6 via the insulating rod 12 rotates about the rotary seal shaft 17 such that the fixed-side end portion 141 moves to the fixed side. Further, when the rotary seal shaft 17 rotates together with the low gas pressure section lever 14, the high gas pressure section lever 21 also rotates about the rotary seal shaft 17 such that the fixed-side end portion 211 moves to the fixed side.

The movable-side main contact point 2*a* fixed to the fixed-side end portion 211 of the high gas pressure section lever 21 moves to the fixed side with rotation of the high gas pressure section lever 21. Therefore, when the shaft 6 moves to the fixed side, the movable-side main contact point 2*a* moves to the fixed side without delay. Whereas, the low gas pressure section rod 19 and the link 18 fixed to the fixed-side end portion 141 of the low gas pressure section lever 14 move to the fixed side with rotation of the low gas pressure section lever 14. When the contact pressure plate 41, the contact pressure spring 42, the contact 43, the movable lead 11, and the movable-side vacuum contact point 5*a* move to the fixed side together with the low gas pressure section rod 19, the movable-side vacuum contact point 5*a* comes into contact with the fixed-side vacuum contact point 5*b*. Even after the movable-side vacuum contact point 5*a* comes into contact with the fixed-side vacuum contact point 5*b*, the contact pressure spring 42 is compressed as the low gas pressure section rod 19 continues to move to the fixed side.

As described above, when the shaft 6 moves to the fixed side, the movable-side main contact point 2*a* and the movable-side vacuum contact point 5*a* move to the fixed side without delay. In addition, since the contact point of the vacuum valve 4 is designed to be closed before the main contact point during the closing operation, the contact pressure spring 42 is compressed until the main contact point is closed after the contact point of the vacuum valve 4 is closed.

Figure 7:
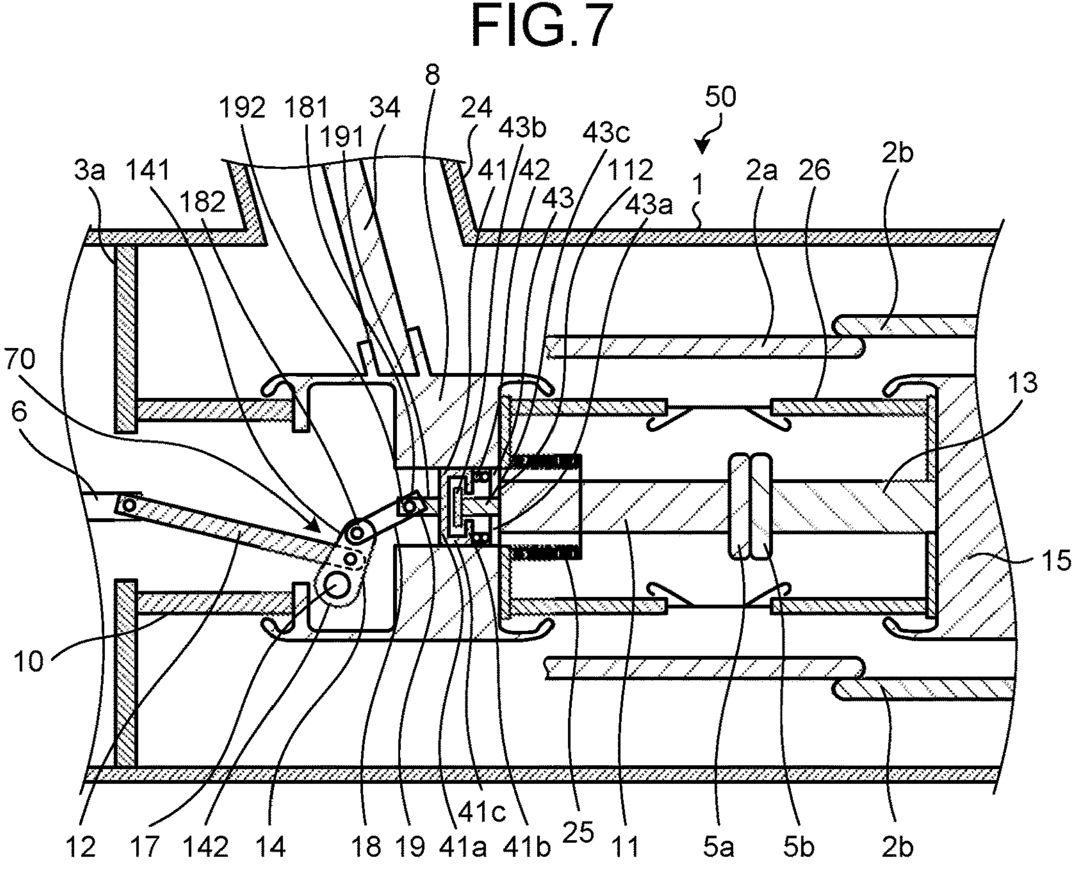
FIG. 7 is a vertical cross-sectional view of a vacuum circuit breaker according to a first modification of the first embodiment.
Figure 8:
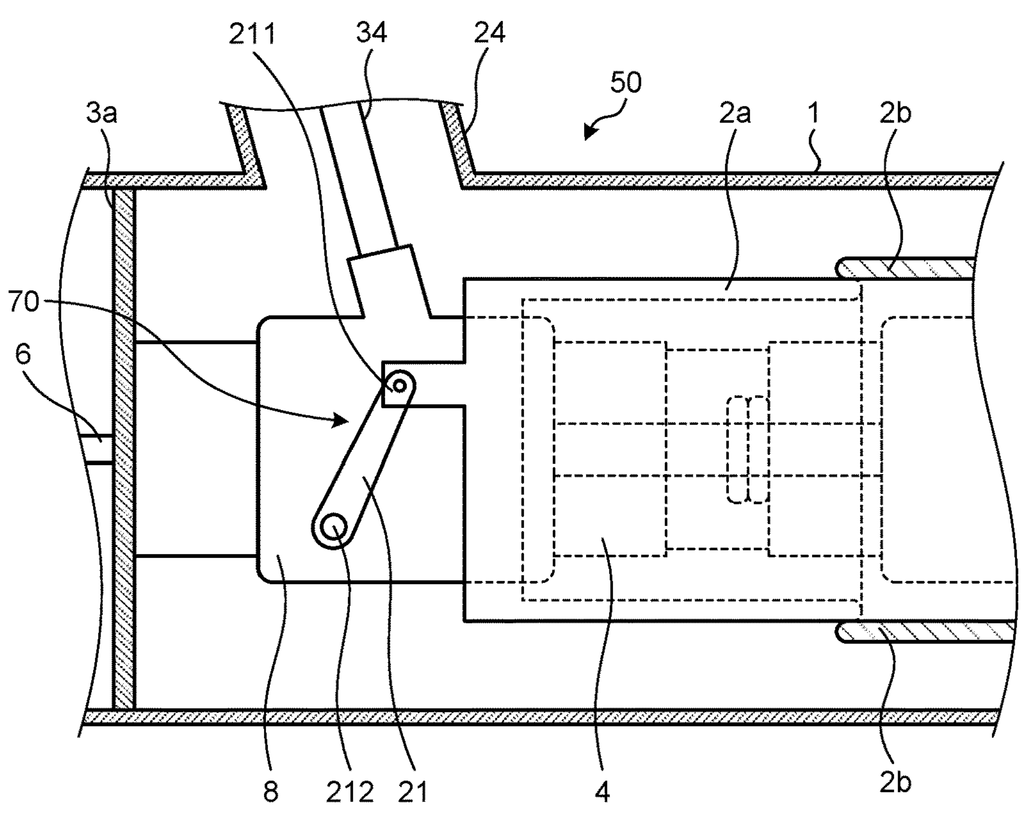
FIG. 8 is a vertical cross-sectional view of the vacuum circuit breaker according to the first modification of the first embodiment.

FIGS. 7 and 8 are vertical cross-sectional views of a vacuum circuit breaker according to a first modification of the first embodiment. The vacuum circuit breaker 50 according to the first modification of the first embodiment is different from the vacuum circuit breaker according to the first embodiment in having a structure called a tulip shape in which an outer cylindrical surface of the movable-side main contact point 2*a* and an inner cylindrical surface of the fixed-side main contact point 2*b* are in contact with each other. The vacuum circuit breaker 50 according to the first modification of the first embodiment is similar to the vacuum circuit breaker 50 according to the first embodiment except that the main contact point has a different structure. Even if the main contact point has the tulip shape, the main contact point can be opened first and then the contact point of the vacuum valve 4 can be opened during the opening operation, and the contact point of the vacuum valve 4 is designed to be closed before the main contact point during the closing operation. Therefore, after the contact point of the vacuum valve 4 is closed, the contact pressure spring 42 is compressed until the main contact point is closed.

Figure 9:
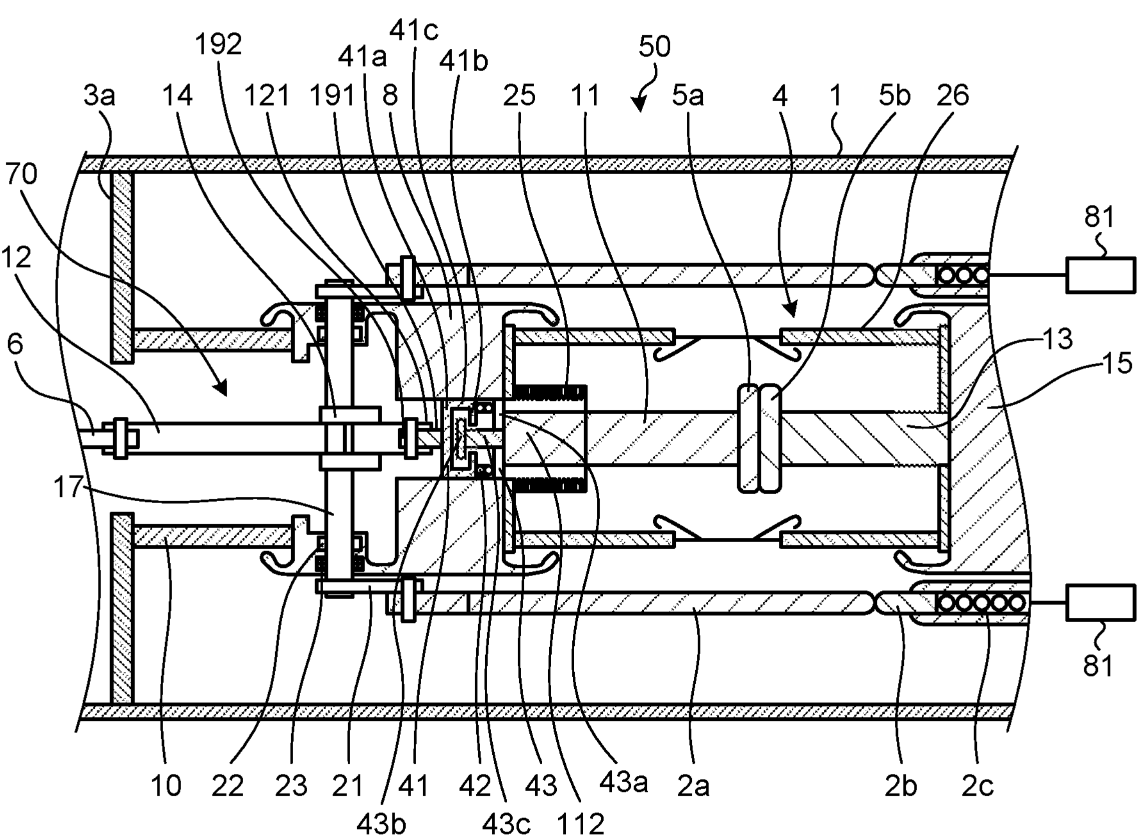
FIG. 9 is a horizontal cross-sectional view of a vacuum circuit breaker according to a second modification of the first embodiment.

FIG. 9 is a horizontal cross-sectional view of a vacuum circuit breaker according to a second modification of the first embodiment. The vacuum circuit breaker 50 according to the second modification of the first embodiment is different from the vacuum circuit breaker 50 according to the first embodiment in that a closing resistor 81 is connected to the fixed-side main contact point 2*b*. By connecting the closing resistor 81 to the fixed-side main contact point 2*b*, system disturbance at a time of system connection can be suppressed. Note that the vacuum circuit breaker 50 may have a structure in which a movable-side resistance contact point and a fixed-side resistance contact point are provided separately from the movable-side main contact point 2*a* and the fixed-side main contact point 2*b*, and a closing resistor is connected to the fixed-side resistance contact point. The vacuum circuit breaker 50 provided with the movable-side resistance contact point and the fixed-side resistance contact point separately from the movable-side main contact point 2*a* and the fixed-side main contact point 2*b* can also suppress system disturbance at the time of system connection.

The vacuum circuit breaker 50 according to the first embodiment transmits a driving force for opening and closing the main contact point to the high gas pressure section lever 21 through the rotary seal shaft 17 rotating together with the low gas pressure section lever 14, and the mechanism for opening and closing the contact point of the vacuum valve 4 and the mechanism for opening and closing the main contact point are partially shared. Therefore, as compared with a vacuum circuit breaker in which the mechanism for opening and closing the contact point of the vacuum valve and the mechanism for opening and closing the main contact point are separately provided, a device size can be downsized. In addition, since the main contact point is provided separately from the contact point of the vacuum valve 4, a large current can be applied.

Second Embodiment

Figure 10:
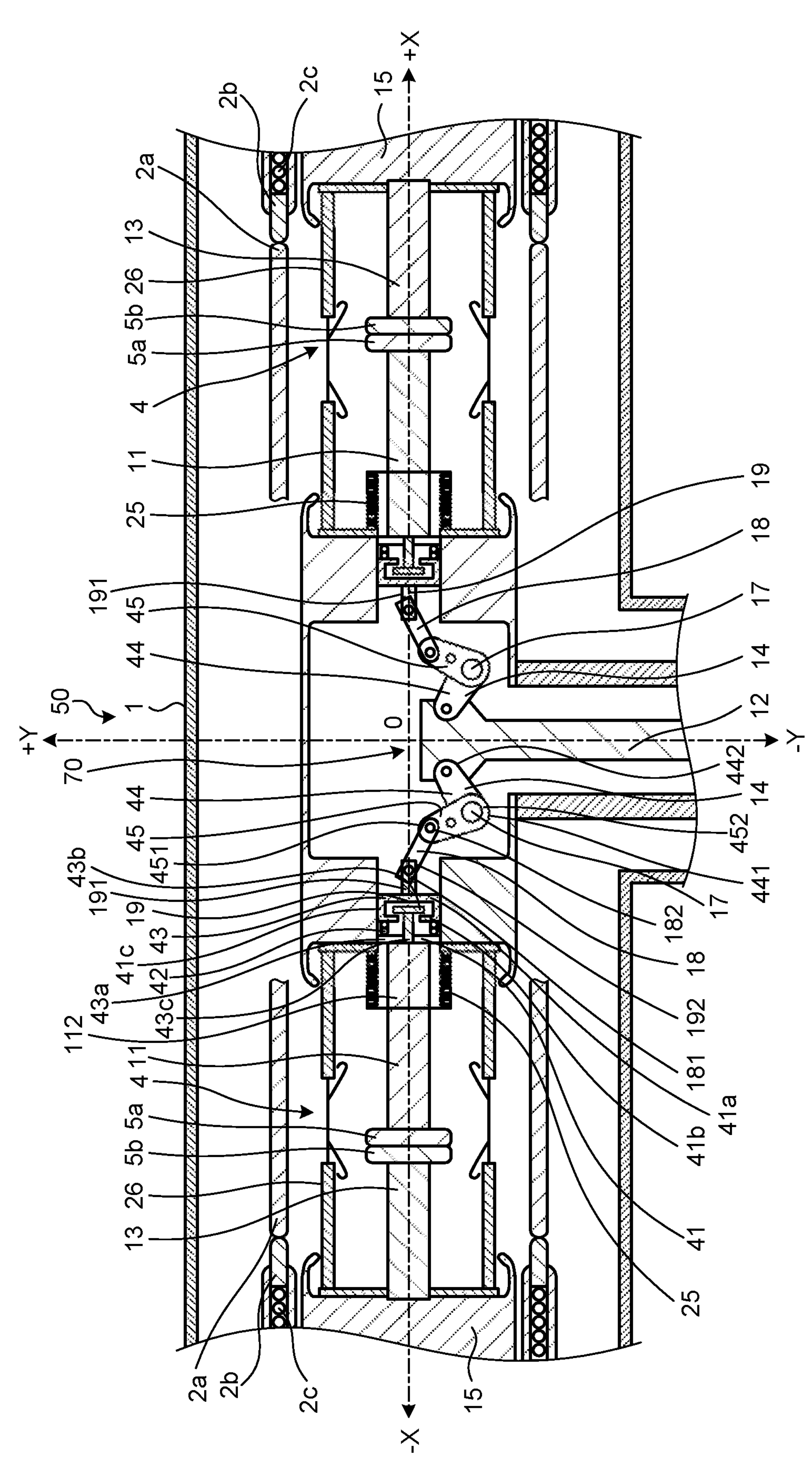
FIG. 10 is a vertical cross-sectional view of a vacuum circuit breaker according to a second embodiment.
Figure 11:
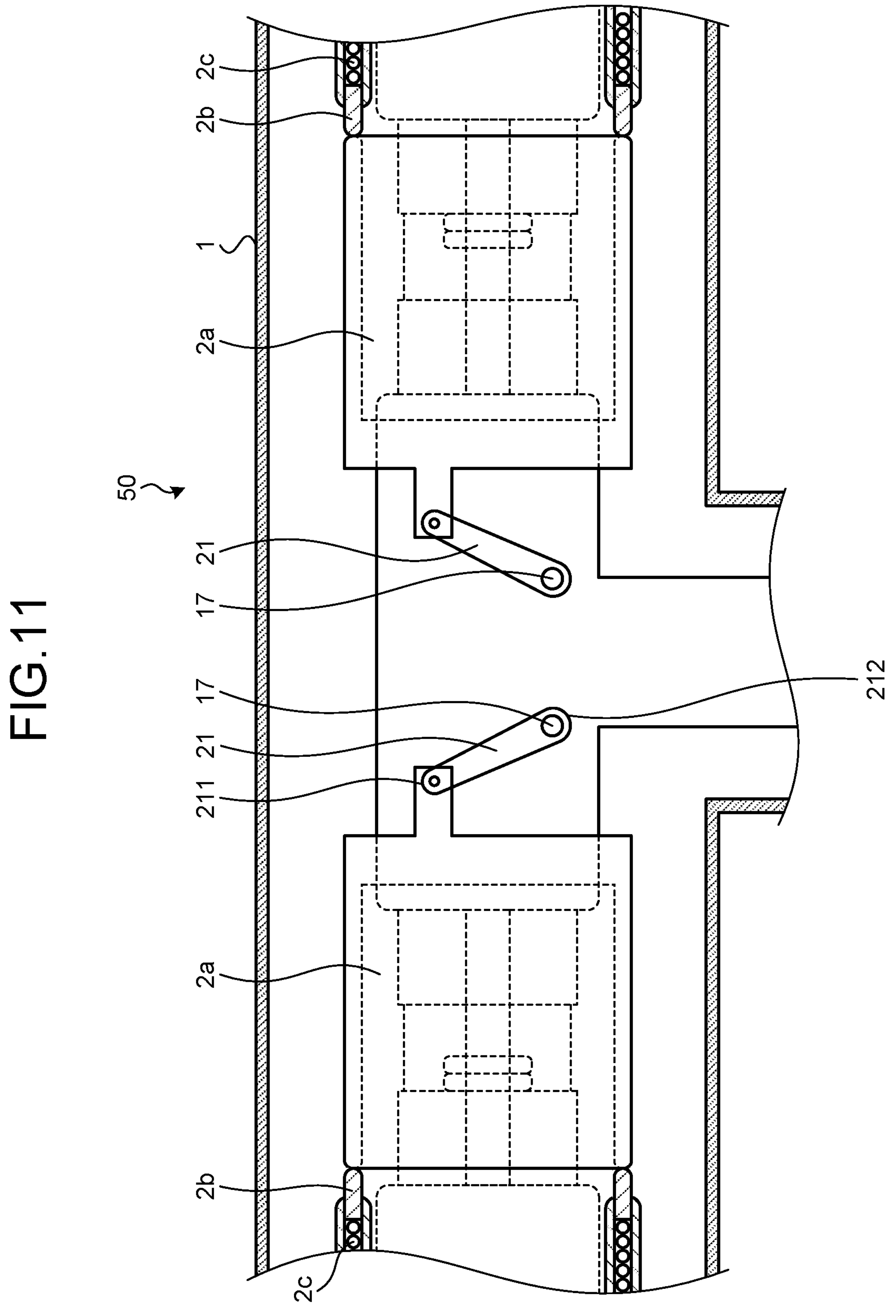
FIG. 11 is a vertical cross-sectional view of the vacuum circuit breaker according to the second embodiment.

FIGS. 10 and 11 are vertical cross-sectional views of a vacuum circuit breaker according to a second embodiment. The vacuum circuit breaker 50 according to the second embodiment includes: the cylindrical tank 1 filled with an insulating gas; and two vacuum valves 4 that are insulated and supported in the tank 1 and each includes the movable-side vacuum contact point 5*a* and the fixed-side vacuum contact point 5*b*. Further, the vacuum circuit breaker 50 also includes the insulating rod 12 that moves in a direction perpendicular to a longitudinal direction of the tank 1. Here, an origin O is defined at a center in the longitudinal direction of the tank 1 and at a center of a cross section perpendicular to the longitudinal direction. In addition, an X axis is defined in the longitudinal direction of the tank 1, and a Y axis is defined in a movable direction of the insulating rod 12. Similarly to the first embodiment, in an arrangement direction of the movable-side vacuum contact point 5*a* and the fixed-side vacuum contact point 5*b*, when a direction from the fixed-side vacuum contact point 5*b* toward the movable-side vacuum contact point 5*a* is defined as a "movable side", and a direction from the movable-side vacuum contact point 5*a* toward the fixed-side vacuum contact point 5*b* is defined as a "fixed side", a smaller coordinate value of the X axis is located on the "movable side" in two points in a region where the coordinate value of the X axis is positive. Similarly, in two points in a region where the coordinate value of the X axis is negative, a larger coordinate value of the X axis is located on the "movable side". Therefore, moving in a direction in which the coordinate value of the X axis decreases means "moving to the movable side" in the region where the coordinate value of the X axis is positive; and moving in a direction in which the coordinate value of the X axis increases means "moving to the movable side" in the region where the coordinate value of the X axis is negative. In addition, moving in a direction in which the coordinate value of the X axis increases means "moving to the fixed side" in the region where the coordinate value of the X axis is positive, and moving in a direction in which the coordinate value of the X axis decreases means "moving to the fixed side" in the region where the coordinate value of the X axis is negative. That is, moving in a direction in which an absolute value of the coordinate value of the X axis decreases means "moving to the movable side", and moving in a direction in which the absolute value of the coordinate value of the X axis increases means "moving to the fixed side".

The fixed-side vacuum contact point 5*b* of each of the two vacuum valves 4 is connected to an external conductor (not illustrated) via the fixed lead 13 and the fixed-side shield 15. That is, the vacuum circuit breaker 50 according to the second embodiment has a two-break structure opened and closed at two points between the external conductors.

The low gas pressure section lever 14 includes a first lever 44 and a second lever 45, and a fixed-side end portion 441 of the first lever 44 and a movable-side end portion 452 of the second lever 45 are fixed to the rotary seal shaft 17. The first lever 44 and the second lever 45 form an angle with each other in a plane perpendicular to the rotary seal shaft 17. A movable-side end portion 442 of the first lever 44 is rotatably fixed to the insulating rod 12. A fixed-side end portion 451 of the second lever 45 is rotatably fixed to the movable-side end portion 182 of the link 18. The fixed-side end portion 181 of the link 18 is rotatably fixed to the movable-side end portion 192 of the low gas pressure section rod 19. The fixed-side end portion 191 of the low gas pressure section rod 19 is fixed to the contact pressure plate 41. Similarly to the vacuum circuit breaker 50 according to the first embodiment, the contact pressure plate 41 has a structure in which the disk-shaped first contact pressure plate 41*a* and the ring-shaped second contact pressure plate 41*b* are connected by the cylindrical portion 41*c*, and an inner diameter of the second contact pressure plate 41*b* is smaller than a diameter of the second contact 43*b*. Similarly to the vacuum circuit breaker 50 according to the first embodiment, the contact 43 includes: the disk-shaped first contact 43*a*; the disk-shaped second contact 43*b* having a diameter smaller than that of the first contact 43*a* and disposed on the movable side with respect to the first contact 43*a*; and the column portion 43*c* connecting the first contact 43*a* and the second contact 43*b*, where the first contact 43*a* is fixed to the movable-side end portion 112 of the movable lead 11. The second contact 43*b* is disposed in a space between the first contact pressure plate 41*a* and the second contact pressure plate 41*b*. The contact pressure spring 42 is provided between the second contact pressure plate 41*b* and the first contact 43*a*, and the contact pressure plate 41 is in contact with the contact 43 via the contact pressure spring 42. The contact pressure spring 42 is in a compressed state in a closing state in which the first contact point constituted by the movable-side vacuum contact point 5*a* and the fixed-side vacuum contact point 5*b* is closed, and presses the first contact 43*a* toward the fixed side to apply a contact pressure to the contact 43. Therefore, in the closing state, the movable-side vacuum contact point 5*a* is pressed against the fixed-side vacuum contact point 5*b* by the contact pressure spring 42.

The movable-side end portion 212 of the high gas pressure section lever 21 is fixed to a portion of the rotary seal shaft 17 disposed in the high gas pressure section. A length of the high gas pressure section lever 21 is longer than a length of the low gas pressure section lever 14. The fixed-side end portion 211 of the high gas pressure section lever 21 is rotatably fixed to the movable-side main contact point 2*a*. The movable-side main contact point 2*a* has a tubular shape to cover the movable-side shield 8 and the vacuum valve 4 from radially outside.

The rotary seal shaft 17 is rotatably supported by a bearing (not illustrated) installed on the movable-side shield 8. A gap between the rotary seal shaft 17 and the movable-side shield 8 is sealed by an airtight material (not illustrated), and gas is suppressed from moving through the gap between the rotary seal shaft 17 and the movable-side shield 8.

When a breaking command is input to an operation device (not illustrated), the insulating rod 12 moves in a −Y direction of being pulled out from the tank 1. The low gas pressure section lever 14 fixed to the insulating rod 12 rotates about the rotary seal shaft 17 such that an absolute value of a coordinate value of the X axis of the fixed-side end portion 441 of the first lever 44 decreases. Further, when the rotary seal shaft 17 rotates together with the low gas pressure section lever 14, the high gas pressure section lever 21 also rotates about the rotary seal shaft 17 such that an absolute value of a coordinate value of the X axis of the fixed-side end portion 211 decreases.

The movable-side main contact point 2*a* fixed to the fixed-side end portion 211 of the high gas pressure section lever 21 moves in a direction in which an absolute value of a coordinate value of the X axis decreases, with rotation of the high gas pressure section lever 21. Therefore, when the insulating rod 12 moves in the −Y direction, the movable-side main contact point 2*a* moves in a direction in which the absolute value of the coordinate value of the X axis decreases without delay. Whereas, the link 18 and the low gas pressure section rod 19 fixed to the fixed-side end portion 451 of the second lever 45 move in a direction in which the absolute value of the coordinate value of the X axis decreases, with rotation of the low gas pressure section lever 14. However, until the contact pressure spring 42 returns to a natural length, a state is maintained in which the movable-side vacuum contact point 5*a* is in contact with the fixed-side vacuum contact point 5*b*. After the contact pressure spring 42 returns to the natural length, the second contact 43*b* is pulled in a direction in which the absolute value of the coordinate value of the X axis decreases by the second contact pressure plate 41*b* as the low gas pressure section rod 19 moves in a direction in which the absolute value of the coordinate value of the X axis decreases, and the contact pressure plate 41, the contact pressure spring 42, the contact 43, the movable lead 11, and the movable-side vacuum contact point 5*a* move in a direction in which the absolute value of the coordinate value of the X axis decreases, to separate the movable-side vacuum contact point 5*a* from the fixed-side vacuum contact point 5*b*.

In this way, the movable-side main contact point 2*a* moves in the direction in which the absolute value of the coordinate value of the X axis decreases without delay when the insulating rod 12 moves in the −Y direction, whereas the movable-side vacuum contact point 5*a* moves in the direction in which the absolute value of the coordinate value of the X axis decreases after the contact pressure spring 42 returns to the natural length. Therefore, the contact point of the vacuum valve 4 is opened after the main contact point is opened first.

When a closing command is input to the operation device (not illustrated), the insulating rod 12 moves in a +Y direction, which is a direction of being pushed into the tank 1. The low gas pressure section lever 14 fixed to the insulating rod 12 rotates about the rotary seal shaft 17 such that an absolute value of a coordinate value of the X axis of the fixed-side end portion 441 of the first lever 44 increases. Further, when the rotary seal shaft 17 rotates together with the low gas pressure section lever 14, the high gas pressure section lever 21 also rotates about the rotary seal shaft 17 such that an absolute value of a coordinate value of the X axis of the fixed-side end portion 211 increases.

The movable-side main contact point 2*a* fixed to the fixed-side end portion 211 of the high gas pressure section lever 21 moves in a direction in which an absolute value of a coordinate value of the X axis increases, with rotation of the high gas pressure section lever 21. Therefore, when the insulating rod 12 moves in the +Y direction, the movable-side main contact point 2*a* moves in a direction in which the absolute value of the coordinate value of the X axis increases without delay. Whereas, the link 18 and the low gas pressure section rod 19 fixed to the fixed-side end portion 451 of the second lever 45 move in a direction in which the absolute value of the coordinate value of the X axis increases, with rotation of the low gas pressure section lever 14. The contact pressure plate 41, the contact pressure spring 42, the contact 43, the movable lead 11, and the movable-side vacuum contact point 5*a* move together with the low gas pressure section rod 19 in a direction in which the absolute value of the coordinate value of the X axis increases, and the movable-side vacuum contact point 5*a* comes into contact with the fixed-side vacuum contact point 5*b*. Even after the movable-side vacuum contact point 5*a* comes into contact with the fixed-side vacuum contact point 5*b*, the contact pressure spring 42 is compressed as the low gas pressure section rod 19 continues to move to the fixed side.

In this way, when the insulating rod 12 moves in the +Y direction, the movable-side main contact point 2*a* and the movable-side vacuum contact point 5*a* move in the direction in which the absolute value of the coordinate value of the X axis increases without delay. In addition, since the contact point of the vacuum valve 4 is designed to be closed before the main contact point is closed during the closing operation, the contact pressure spring 42 is compressed until the main contact point is closed after the contact point of the vacuum valve 4 is closed.

The vacuum circuit breaker 50 according to the second embodiment transmits a driving force for opening and closing the main contact point to the high gas pressure section lever 21 through the rotary seal shaft 17 rotating together with the low gas pressure section lever 14, and the mechanism for opening and closing the contact point of the vacuum valve 4 and the mechanism for opening and closing the main contact point are partially shared. Therefore, as compared with a vacuum circuit breaker in which the mechanism for opening and closing the contact point of the vacuum valve 4 and the mechanism for opening and closing the main contact point are separately provided, a device size can be downsized. In addition, since the main contact point is provided separately from the contact point of the vacuum valve 4, a large current can be applied.

Note that, although the vacuum circuit breaker 50 having a two-break structure opened and closed at two points between the external conductors has been described here, the vacuum circuit breaker 50 may have a multi-break structure opened and closed at three or more points between the external conductors.

The configurations illustrated in the above embodiments illustrate one example of the contents and can be combined with another known technique, and it is also possible to omit and change a part of the configuration without departing from the subject matter.

REFERENCE SIGNS LIST

1 tank; 2*a* movable-side main contact point; 2*b* fixed-side main contact point; 2*c*, 42 contact pressure spring; 3*a* support plate; 4 vacuum valve; 5*a* movable-side vacuum contact point; 5*b* fixed-side vacuum contact point; 6 shaft; 8 movable-side shield; 10 movable-side insulating support cylinder; 11 movable lead; 12 insulating rod; 13 fixed lead; 14 low gas pressure section lever; 15 fixed-side shield; 17 rotary seal shaft; 18 link; 19 low gas pressure section rod; 21 high gas pressure section lever; 22 bearing; 23 airtight material; 24 bushing; 25 bellows; 26 vacuum container; 34 external conductor; 41 contact pressure plate; 41*a* first contact pressure plate; 41*b* second contact pressure plate; 41*c* cylindrical portion; 43 contact; 43*a* first contact; 43*b* second contact; 43*c* column portion; 44 first lever; 45 second lever; 50 vacuum circuit breaker; 70 contact point driver; 81 closing resistor; 112, 142, 182, 192, 212, 442, 452 movable-side end portion; 121, 141, 181, 191, 211, 441, 451 fixed-side end portion.

The invention claimed is:

1. A vacuum circuit breaker comprising:

a tank having a cylindrical shape;

a vacuum valve accommodated in the tank and including:

a movable-side vacuum contact point;

a fixed-side vacuum contact point;

a movable lead electrically connected to the movable-side vacuum contact point; and a fixed lead electrically connected to the fixed-side vacuum contact point;

a movable-side shield formed using a conductive material in a tubular shape and installed on a movable side of the vacuum valve;

a movable-side main contact point having a tubular shape configured to cover the vacuum valve and the movable-side shield from radially outside;

a fixed-side main contact point disposed to face the movable-side main contact point;

a contact point driver configured to:

open and close a first contact point constituted by the movable-side vacuum contact point and the fixed-side vacuum contact point; and open and close a second contact point constituted by the movable-side main contact point and the fixed-side main contact point, by moving the movable-side vacuum contact point and the movable-side main contact point in conjunction with each other; and an insulating rod configured to transmit a force for opening and closing the first contact point and the second contact point in conjunction with each other to the contact point driver, wherein the contact point driver includes:

a contact configured to electrically connect the movable-side shield and the movable lead, the contact being fixed to a movable-side end portion of the movable lead and disposed in a cylinder of the movable-side shield;

a low gas pressure section lever disposed in a cylinder of the movable-side shield and connected to the contact via a contact pressure applier configured to apply a contact pressure to the contact;

a rotary seal shaft fixed to the low gas pressure section lever, rotatably supported by the movable-side shield, penetrating the movable-side shield, and having an end portion exposed to a high gas pressure section inside the tank and outside the movable-side shield; and a high gas pressure section lever that is fixed to a portion of the rotary seal shaft exposed to the high gas pressure section, and is rotatably connected to the movable-side main contact point, wherein the movable-side shield and the rotary seal shaft are sealed with an airtight material.

2. The vacuum circuit breaker according to claim 1, wherein the high gas pressure section lever is longer than the low gas pressure section lever.

3. The vacuum circuit breaker according to claim 1, wherein the vacuum circuit breaker has a multi-break structure including two or more vacuum valves and two or more contact point drivers.

4. The vacuum circuit breaker according to claim 1, wherein a closing resistor is connected to the fixed-side main contact point.

5. The vacuum circuit breaker according to claim 1, wherein a movable side resistance contact point is connected to the high gas pressure section lever, and the vacuum circuit breaker includes:

a fixed-side resistance contact point disposed to face the movable-side resistance contact point; and a closing resistor connected to the fixed-side resistance contact point.

* * * * *